A. KEAGY.
Clover Huller.
No. 1,190. Patented June 24, 1839.
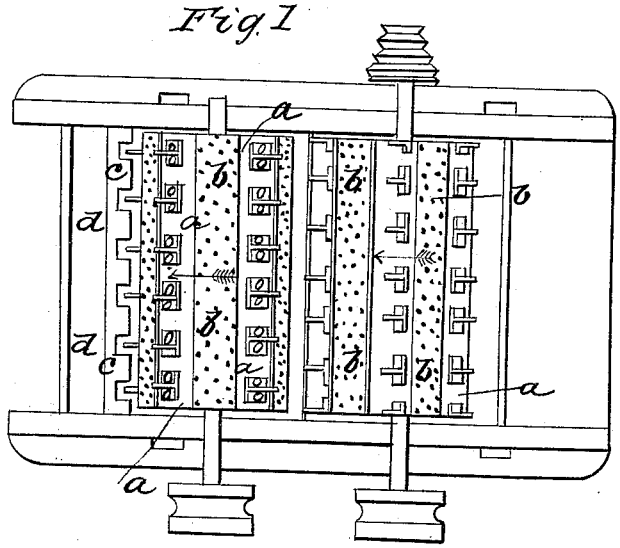
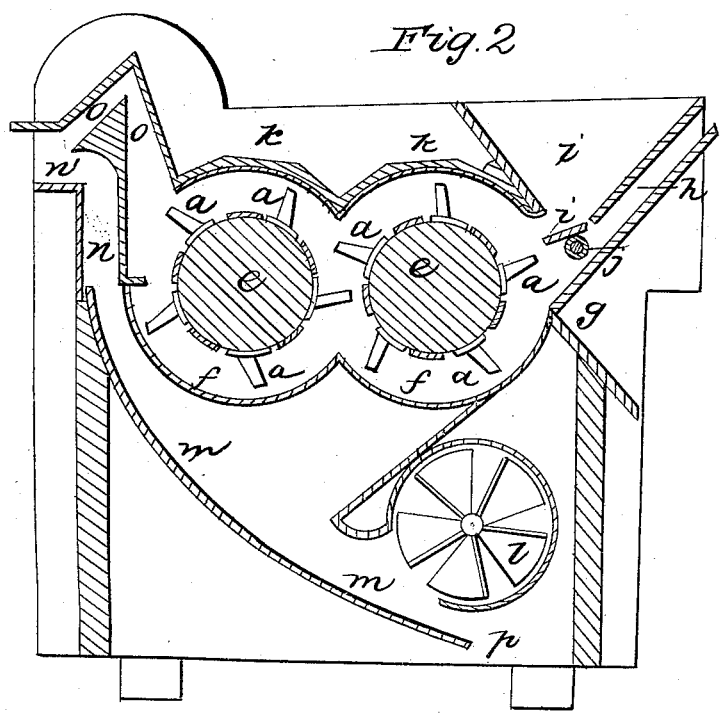

UNITED STATES PATENT OFFICE.

ABM. KEAGY, OF MORRISON'S COVE, PENNSYLVANIA.

MACHINE FOR HULLING CLOVER AND OTHER GRASS SEEDS.

Specification of Letters Patent No. 1,190, dated June 24, 1839.

*To all whom it may concern:*

Be it known, that I, ABRAHAM KEAGY, of Morrison's Cove, in the county of Bedford and State of Pennsylvania, have invented certain Improvements in the Manner of Constructing Machines for Hulling Clover-Seed and other Grass-Seeds; and I do hereby declare that the following is a full and exact description thereof.

In the accompanying drawing, Figure 1 represents a top view of the milling cylinders, and such other parts as are exposed to view when the cap, or cover of the machine is removed. These cylinders have along them projecting teeth of sheet iron, set in rows, lengthwise of the cylinder, as shown at $a, a$, and of these rows there may be five or six in number, each tooth projecting from an inch and a half to two inches from the cylinder; between these rows there are sheet iron graters, $b, b, b$, made in the usual manner, and fastened to the cylinders. The cylinders are made to revolve in the direction of the arrow, toward the iron comb $c, c$, between the spaces in which the teeth of the rear cylinder pass, while the teeth of the fore cylinder pass between those of the rear; $d, d$, is an opening through which the chaff is blown by means of the fan wheel to be presently described.

Fig. 2 is a vertical section of the machine from front to back, exhibiting the respective spaces and operating parts, the cap, or cover, being in place; $e, e$, on the hulling cylinders, with their teeth $a, a; f f$, are two concaves of sheet iron, or other material perforated with numerous holes to admit the seed to pass through, and detain the chaff, which is carried up by the motion of the cylinders, and falls out at the opening $g$, there being a sliding shutter at $n, n$, to close this opening entirely when it is desired to carry the chaff and seed around again by the cylinder, or which may close said opening in any required degree. The seed to be hulled is put into the hopper $i$, the lower board, $i'$, of the hopper being agitated, or shaken by a piece $j$, fixed on a shaft, and made to revolve below it, so as to effect the feeding. Above the cylinders there are concave graters of sheet iron $k, k$, between which and the cylinders the seed is effectually rubbed out. A fan wheel $l$, of the ordinary construction, blows the chaff which passes down with the seed, up the curved piece $m$, and out through the aperture $n, n$, at the rear of the machine. There is another cavity $o, o$, leading from the cavity containing the cylinders into the opening $n'$, at the rear of the machine, allowing wind to escape, and carry chaff and dust thereto from the cylinder chamber. The cleaned seed is delivered through the opening $p$, at the bottom of the machine.

The front edges of the teeth $a, a$, I check, or make rough, or jagged, by a chisel, punch, or otherwise, so as to cause them to take hold of, and act upon, the hull with effect. The machine may be driven by hand, or by other power, the requisite bands and whirls being employed in the ordinary way.

I do not claim the cylinders, graters, for wheel, or any other of the individual parts of this machine, taken alone; but What I do claim as of my invention, and desire to secure by Letters Patent, is—

The particular manner in which I have combined these parts together so as to constitute a machine such as I have described; that is to say, a machine for hulling having two hulling cylinders revolving in the same direction, furnished with rows of teeth and graters alternately, as set forth, and having a double concave grater above said cylinders, with the respective apertures combined and connected as described.

ABRAHAM KEAGY.

Witnesses:
 THOS. P. JONES,
 GEO. NAYLOR.